United States Patent [19]

Morello

[11] 4,186,263

[45] Jan. 29, 1980

[54] INJECTION MOLDABLE AMIDE-IMIDE TERPOLYMERS CONTAINING DIVALENT AROMATIC QUINONE RADICALS

[75] Inventor: Edwin F. Morello, Naperville, Ill.

[73] Assignee: Standard Oil Company (Indiana), Chicago, Ill.

[21] Appl. No.: 947,087

[22] Filed: Sep. 29, 1978

[51] Int. Cl.$^2$ .................... C08G 73/10; C08G 73/16
[52] U.S. Cl. .............................. 528/128; 528/125; 528/172; 528/220; 528/226; 528/229; 528/350; 528/352; 264/328
[58] Field of Search ............... 528/128, 220, 172, 226, 528/229, 350, 352, 125

[56] References Cited

U.S. PATENT DOCUMENTS

| | | | |
|---|---|---|---|
| 3,573,260 | 3/1971 | Morello | 528/350 |
| 3,748,304 | 7/1973 | Stephens | 528/350 |
| 3,920,612 | 11/1975 | Stephens | 528/350 |
| 4,048,144 | 9/1977 | Stephens | 528/350 |

*Primary Examiner*—Lester L. Lee
*Attorney, Agent, or Firm*—Gunar J. Blumberg; Arthur G. Gilkes; William T. McClain

[57] ABSTRACT

Novel terpolymers of the amide-imide type are prepared from tricarboxylic-acid-anhydride derivatives, aromatic diamino quinones and two other wholly-aromatic primary diamines. The novel terpolymers are useful for preparing molded articles of superior properties at injection molding temperatures lower than required for molding the amide-imide copolymers disclosed in the prior art.

19 Claims, No Drawings

INJECTION MOLDABLE AMIDE-IMIDE TERPOLYMERS CONTAINING DIVALENT AROMATIC QUINONE RADICALS

BACKGROUND OF THE INVENTION

Field of the Invention

The field of this invention relates to polyamide-imide terpolymers prepared in an organic solvent and to molding powders and molded articles prepared therefrom.

Background

Amide-imide polymers and copolymers are a relatively new class of organic compounds known for their solubility in nitrogen containing organic solvents when in the largely polyamide form. The major application of these amide-imide polymers has been as wire enamels. This is illustrated in U.S. Pat. Nos. 3,661,832 (1972), 3,494,890 (1970) and 3,347,828 (1967). All three of the foregoing patents are incorporated herein by reference. Amide-imide polymers and copolymers have also been found useful for molding applications as shown in U.S. Pat. Nos. 4,016,140 (1977) and 3,573,260 (1971). Both are incorporated herein by reference. Amide-imide copolymers have been molded by a process comprising heat treating the copolymers for a relatively short period of time and then applying heat and pressure to form a shaped article. However, to mold these copolymers entails the use of special injection molding equipment capable of withstanding injection molding temperatures in the range of 625° F. to 700° F., at a molding pressure in excess of 20,000 lbs. per square inch. Most fabricators do not have the specialized extruders or injection molding equipment needed to operate at these severe operating conditions and this factor has restricted the commercialization of amide-imide copolymers in injection molding applications.

The general object of this invention is to provide polyamide-imide terpolymers containing aromatic quinone moieties. A more specific object of this invention is to provide polyamide-imide terpolymers suitable for use as an engineering plastic particularly for use in injection molding wherein the molding operation can be conducted at temperatures lower than those required when molding the polyamide-imide homopolymers and copolymers disclosed in the prior art. Other objects appear hereinafter.

I have now found that a novel class of terpolymers obtained by reacting the benzene tricarboxylic-acid-anhydride derivatives with a mixture of aromatic diamino quinones and two other aromatic diamines can be molded at lower temperatures than the conventional amide-imide copolymers disclosed in U.S. Pat. No. 3,748,304, incorporated herein by reference. The novel terpolymers of this invention can be injection molded at barrel temperatures of approximately 550° F.-575° F. which allows the use of conventional extruders and injection molding equipment and thus will insure the widespread use of the novel terpolymers in injection molding applications.

Our studies have shown that the ability of the novel terpolymer to be injection molded at lower temperatures is closely related to the melt flow characteristics of the polyamide-imide terpolymers containing the aromatic quinone moieties. The terpolymers suitably should have a melt flow of about 1 to 400 grams per 10 minutes at 99 percent solids content to produce a satisfactory injection molded article, i.e., one having after annealing, an ultimate annealed tensile strength in the range of about 15,000 to about 32,000 pounds per square inch (p.s.i.) and a percentage elongation at break in the range of about 5 to about 20 percent, both determined according to ASTMD-1708. If the terpolymers have a melt flow below about 1 gram per 10 minutes, the molded articles made therefrom have a substantially decreased ultimate tensile strength below that which can otherwise be achieved for that particular terpolymer after a process of heat annealing. Our studies indicate that injection molding of copolymers having a melt flow substantially below 1 gram per 10 minutes has been difficult since the molds have been incompletely filled and the molded articles have had poor appearance. These disadvantages have been overcome by utilizing the novel terpolymers of this invention which have suitable melt flows of about 1 to 400 grams, preferably 5 to 375 grams, per 10 minutes at 99 percent solids content.

The terpolymers of this invention are prepared by reacting an acyl halide derivative of an aromatic tricarboxylic-acid-anhydride with three different aromatic diamines, one of which must be an aromatic diamino quinone having about 14 to 26 carbon atoms and an aliphatic diamine containing from 2 to 10 carbon atoms. These terpolymers can be described as polyamides having some polyamide-polyimide linkages, said polyamides being capable when heated of conversion to the polyamide-imide form. Such polyamide terpolymers are high molecular weight polymeric compounds having in their molecule reoccurring A units of the following structure:

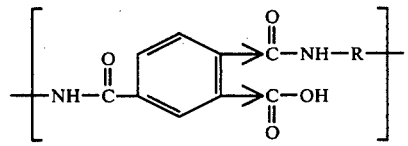

wherein an arrow denotes isomerism and wherein R comprises $R_1$, $R_2$, $R_3$ and $R_4$ and $R_1$ is a divalent aromatic quinone radical having from 14 to 26 carbon atoms, $R_2$ and $R_3$ are different and are divalent aromatic hydrocarbon radicals of from 6 to 10 carbon atoms joined directly or by stable linkages consisting of —O—, methylene,

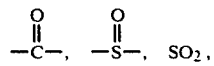

and —S— radicals, and $R_4$ is a saturated alkylene radical of from 2 to 10 carbon atoms and wherein the mole ratio of the $R_1$ containing units to the sum of the $R_2$, $R_3$ and $R_4$ containing units is about 1:99 to about 1:9. In the preferred terpolymer R comprises $R_1$, $R_2$ and $R_3$ and the mole ratio of the $R_1$ containing units to the sum of the $R_2$ and $R_3$ containing units is about 1:99 to about 1:9. Suitably the mole ratio of the $R_2$ and $R_3$ containing units is about 1:1, advantageously about 3:7 to about 7:3. The mole ratio of the $R_4$ containing units to the sum of the $R_1$, $R_2$ and $R_3$ containing units can be about 1:99 to about 5:95, usually it is less than 1 mole percent. These polyamide terpolymers are capable of substantially complete imidization by heating to form polyamide-imide terpolymer structures having to a substantial extent reoccurring B units of the following structure:

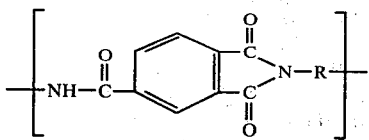

wherein $R_1$, $R_2$, $R_3$ and $R_4$ are defined as above. The mole ratio of $R_1$, $R_2$, $R_3$ and $R_4$ units is the same as for the A units. Usually the terpolymers of this invention can have 1 mole percent of A units and 99 mole percent of the B units or conversely 99 mole percent of the A units and 1 mole percent of the B units. Suitably, a terpolymer of this invention can contain about 30 mole percent A units and 70 mole percent B units and 70 mole percent A units and 30 mole percent B units. After annealing the amide-imide moieties predominate, usually in excess of 50 mole percent.

The polyamide-imide terpolymers of this invention are prepared from an anhydride containing substance and one aromatic diamino quinone and two different aromatic diamines and an aliphatic diamine. Suitably the anhydride containing substance is an acyl halide derivative of acid anhydride having a single benzene or lower alkyl substituted benzene ring. The preferred anhydride is the 4 acid chloride of trimellitic acid anhydride (4 TMAC). Useful aromatic diamino quinones include diaminoanthraquinones, diaminoanthrone, diaminopyrenenquinone, diaminophenanthrenequinone, etc. Aromatic diamino quinones having linear structures are preferred. Advantageously, the aromatic diamino quinones have the following generic formula:

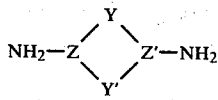

wherein Z and Z' are the same or different and are divalent aromatic moieties containing from 1 to 3 benzene rings and Y is a stable linkage selected from the group of

and —CH$_2$— and Y' is selected from the group of

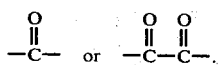

These diamino quinones can also have other ring substituents such as alkyl and cyano groups. The other two aromatic primary diamines are aromatic diprimary diamines having from 6 to 10 carbon atoms or aromatic diprimary diamines composed of two aromatic moieties of 6 to 10 carbon atoms each, each such moiety containing one primary amino group and being linked to the other moiety either directly or through a relatively stable bridging group such as the following:

—O—, —S—, —SO$_2$—, —CO— or methylene. Examples of such diamines include para- and meta-phenylenediamine, para- and meta-xylenediamine, oxybis(aniline), thiobis(aniline), sulfonylbis(aniline), diaminobenzophenone, methylenebis(aniline), benzidine, 1,5-diaminonaphthalene, oxybis(2-methylaniline), thiobis(2-methylaniline), and the like. Examples of useful aromatic primary diamines are set out in U.S. Pat. No. 3,494,890 (1970) and U.S. Pat. No. 4,016,140 (1977), both incorporated herein by reference. Of course, mixtures of the aforementioned diamines can be used and a minor amount of other diamines such as aliphatic diamines can be used. Alkylene diamines such as ethylenediamine, propylenediamine, 2,2-dimethylpropylenediamine, hexamethylenediamine and decamethylenediamine are exemplary of such other diamines. From the standpoint of physical properties of molded articles it is preferred that the diamines be aromatic primary diamines. The superior thermal and physical properties can be attributed to a large extent to the properties of aromatic diamine and the trimellitic anhydride moiety. The aromatic diamino quinone moieties contribute to the advantageous flow properties and facilitate the injection molding of the terpolymers at lower barrel temperatures than used for the conventional polyamide-imide copolymers. The superior properties of the terpolymers of this invention are dependent upon the mole ratio of the primary diamines and diaminoanthraquinones used and upon their chemical nature. To achieve a terpolymer usefully combining the properties of both diamines and the diaminoanthraquinone, it is suitable to stay within the range of about 10 mole percent of the first diamine, 80 mole percent of the second diamine and 10 mole percent of the aromatic diamino quinone to about 89 mole percent of the first diamine, 10 mole percent of the second diamine and 1 mole percent of the aromatic diamino quinone. Advantageously the range is about a 20:70:10 mole ratio to about a 79:20:1 mole ratio. In the preferred embodiment wherein the acyl chloride of trimellitic acid is terpolymerized with a mixture of 2,6 diaminoanthraquinone, p,p'oxybis(aniline) and meta-phenylenediamine, the preferred range is from about 1 mole percent diaminoanthraquinone, 69 mole percent p,p'-oxybis(aniline) and 30 mole percent meta-phenylenediamine to about 10 mole percent diaminoanthraquinone, 60 mole percent p,p'oxybis(aniline) and 30 mole percent meta-phenylenediamine. Preferably the mixture of diamines is composed of 2,6 diaminoanthraquinone, p,p'-oxybis(aniline) and meta-phenylenediamine. In place of the 2,6 diaminoanthraquinone, the 1,4 and 1,5 diaminoanthraquinones are suitably employed. The remaining 2 diamino components are preferably composed of meta-phenylenediamine and p,p'-oxybis(aniline), or p,p'-oxybis(aniline) and one of the following: p,p'-methylenebis(aniline) or p,p'-sulfonylbis(aniline).

Our studies indicate that incorporating the diamino aromatic quinone moiety having 14 to 26 carbon atoms in the terpolymer, significantly improves the injection moldability of the terpolymer. It is critical that the quinone moiety become part of the terpolymer chain. In U.S. Pat. No. 3,677,992, incorporated herein by reference, it is shown that ketones can be used as flow aids for conventional polyamide-imide homopolymers. It should be noted that in the prior art the ketones were not incorporated into the polymer chain. Our studies indicate that the use of ketones as flow aids is unsatisfactory for injection molding applications. This is due to the high processing temperatures and pressures utilized in injection molding. When an attempt was made to utilize the ketones disclosed in the aforementioned U.S. patent, noxious vapors were emitted from the injection molding machine and plasticizer loss made additive level control inoperable. Poor compatibility also limited the amount which could be used without seriously affecting the properties of the molded products.

These novel polymers are terpolymerized in the presence of nitrogen containing solvents such as N-methyl-pyrrolidone, and N,N-dimethylacetamide. The reaction should be carried out under substantially anhydrous conditions at the temperatures below 150° C. Most advantageously, the reaction is carried out from about 30° C. to 50° C.

The reaction time is not critical and depends primarily on the reaction temperature. It can vary from about 2 to 10 hours with about 2 to 6 hours at about 30° C. to 50° C. preferred for the nitrogen containing solvents. The mixture of the diamine containing substances and the anhydride containing substance is suitably present in approximately equimolar ratio. However, variations of up to about 2 mole percent in either direction do not substantially affect the injection moldability of the resulting terpolymers. The terpolymer reaction product can conveniently be separated from the reaction solvent and hydrogen halide by-product by precipitating the terpolymers by mixing the reaction medium with distilled water and further washing the terpolymers with additional distilled water. The initial reaction between the acyl halide derivative of trimellitic anhydride and the diamine mixture results in the polyamide having an amide content greater than 50 percent of the linking units in the terpolymers. The amide content varies from about 55 to 100 percent and the imide content varies from about 0 to 45 percent. Prior to injection molding it may be suitable to give a final heat treatment or annealing. In that event the terpolymer is heated at a temperature from about 425° F. to 525° F. for about 24 to 72 hours, preferably from about 475° F. to 500° F. for about 24 to 48 hours for the terpolymers prepared from the acyl chloride of trimellitic anhydride, diaminoanthraquinones, p,p'-oxybis(aniline) and meta-phenylenediamine. This treatment partially imidizes the polymer and prevents water evolution in the molding step which would cause formation of voids in the molded item.

Molding conditions for the terpolymers vary with the type of mold used and the size and configuration of the molded pieces. A typical molding schedule for compression molding of small items is given in Table 1 below.

TABLE 1

COMPRESSION MOLDING SCHEDULE FOR TERPOLYMERS FROM 4-TMAC, DAA, MPDA AND OBA*

1. Preheat mold in press to 500° F. to 600° F.
2. The cold terpolymers were charged directly to the hot mold and pressed according to the following molding schedule. A 78 gram charge gives a 5" diameter by ⅛" disc:

|    | Pressure tons | Time Minutes | Pressure p.s.i. |
|----|---------------|--------------|------------------|
| 1. | 2½            | 10           | 210              |
| 2. | 10            | 4            | 840              |
| 3. | 25            | 3            | 2,100            |
| 4. | 50            | 3            | 4,200            |
| 5. | 25            | 5            | 2,100            |

3. The mold and contents are cooled to 500° F. under pressure (25 tons) and the molded specimen ejected and tested according to ASTMD-1708 for ultimate tensile strengths and percentage elongation at break.

*See Table 3 for meaning of abbreviations

The results are given in Table 4 for the compositions prepared in Examples 1 through 10. All of the preferred samples tested had tensile strengths in the range of 9,700 to 20,000 p.s.i. and elongation of 4.5 to 20 percent, which indicates that they are useful for injection molding. It is to be noted that compression molding has been found to be useful as a screening test for possible injection moldable polymers. Suitably, the terpolymers are charged cold to the mold and conditioned to temperature equilibrium in the mold or oven heated prior to molding at about 500° F. Useful molding temperatures of from about 200° F. to about 750° F. at pressures of about 1,000 p.s.i. to about 20,000 p.s.i. are used. Preferably molding temperatures of about 500° F. to 600° F. at pressures of about 1,000 to 8,000 p.s.i. are used.

When injection molding the terpolymer is normally injected into a mold maintained at about 440° F. A 1 minute mold cycle is used with a barrel temperature of about 500° F. to 625° F. The injection molding conditions are given in Table 2.

TABLE 2

| Mold Temperature | 440° F. |
|---|---|
| Injection Pressure | 19,000 p.s.i. and held for 22 seconds |
| Back Pressure | 210 p.s.i. |
| Cycle Time | 22 seconds |
| Extruder: | |
|   Nozzle Temperature | 550° F. to 600° F. |
|   Barrels: | |
|     Front heated to | 550° F. to 615° F. |
|   Screw: | |
|     40 revolutions/minute | |
|     L/D 1/1 | |

The properties of the terpolymers prepared in Examples 1–10 when they have been injection molded are given in Table 5.

A series of terpolymers were prepared from the 2,6 1,4, or 1,5 isomers of diaminoanthraquinone, p,p'-oxybis(aniline) and meta-phenylenediamine using different diamine mole ratios and tensile strengths and elongation data, measured on molded products obtained therefrom. This data is tabulated in Tables 4 and 5 along with melt flow properties of the terpolymers. The melt flow properties of the terpolymers of this invention at molding temperatures are much better than for the usual amide-imide type copolymer disclosed in U.S. Pat. No. 4,016,140 (1977) and in the Control example. Thus it can be seen from Table 4 that while the control has a melt flow of 0.43 grams per 10 minutes at 99 percent solids content, the terpolymers of this invention have melt flows in the range of 5 to 362.7 grams per 10 minutes at 99 percent solids content. The melt flow throughout the Specification and Claims is expressed as grams of extrudate per 10 minutes. The following procedure was used for measuring melt flow (M.F.): From 9 grams of polymer heated from room temperature (72° F.) to 600° F. over a period of 25-30 minutes in a standard Buehler mold assembly (1"×1¾"), ten 1"-2" samples are extruded through a 1/16" die, having a length to inside diameter of 10:1 by a 1" ram applying a force of 3,000 pounds thereto. Extrudate obtained during a known interval from said die are weighed, and expressed as grams of extrudate that would have flowed in an interval of 10 minutes under the above conditions.

The terpolymers of this invention have inherent viscosities when dissolved in a solvent such as N,N-dimethylacetamide in excess of about 0.3. The inherent viscosity is measured in a Cannon viscometer by running solutions containing 0.5 gram of terpolymer per 100 ml. of dimethylacetamide at 25° C. The inherent viscosity is calculated from this data according to the procedures set forth on page 44 of *Preparative Methods of Polymer Chemistry*, Second Edition (1968), by W. R. Sorenson and T. W. Campbel.

The following Examples illustrate the preferred embodiments of this invention. It will be understood that these Examples are for illustrative purposes only and do not purport to be wholly definitive with respect to the conditions or scope of the invention.

EXAMPLE 1

Reaction was carried out in a 10 liter, 4 neck, round bottom flask equipped with nitrogen purge, stirrer, addition funnel and thermometer. 883.1 grams (4.41 moles) of p,p'-oxybis aniline (OBA) and 227.8 grams (2.10 moles) of meta-phenylenediamine (MPDA) and 116.8 grams (0.49 moles) of 2,6 diaminoanthraquinone were dissolved in 6,452 grams of N-methylpyrrolidone (NMP). 1,473.5 grams (7.0 moles) of the 4 acid chloride of trimellitic anhydride (4 TMAC), in flake form, were then added to the diamine solution in increments over a two hour period. The reaction exotherm was allowed to raise the temperature to 40° C. and this temperature was maintained for the remainder of the 4 TMAC addition. Cooling water was used as needed. After 4 TMAC addition was complete, stirring was continued without further heating until solution viscosity reached 95 poises, measured at 25° C. with a Gardner Bubble viscometer. The reaction solution was then drained from the reactor and polymer stranding was commenced immediately in order to minimize viscosity increase. The polymer was precipitated by extruding through eight 1/16" circular dies into water over a period of 1-2 hours, and the terpolymer strand was chopped from a Cowles-type mixer blade. Solution viscosity increased to 104 poises during this period. After stranding and chopping the polymer was washed with distilled water to pH 4-5 in a steel tank. The polymer was air dried over several days on a filter funnel before further heating. The polymer was then heat cured for approximately 1½ hours at 500° F. Water content determined by weight loss at 500° F. (20 minutes) was 2 to 3 percent. Samples of this terpolymer were both compression molded and injection molded. The physical properties of this terpolymer are shown in Tables 4 and 5.

EXAMPLE 2

This Example illustrates the preparation of a high molecular weight polyamide-imide terpolymer having a good melt flow and excellent physical properties. Reaction was carried out in a 10 gallon Pfaudler kettle equipped with a nitrogen purge, stirrer, addition funnel and thermocouple. 8.59 lbs. (19.46 moles) meta-phenylenediamine (MPDA), 2.23 lbs. (9.27 moles) p,p'-oxybis aniline (OBA) and 1.14 lbs. (2.16 moles) 2,6 diaminoanthraquinone (2,6 DAA) were dissolved in 56.5 lbs. of N-methylpyrrolidone (NMP). The 4 acid chloride of trimellitic acid anhydride (4 TMAC), 14.24 lbs. (30.89 moles), in flake form, were then added to the diamine solution in portions over a 1 hour period. The reaction exotherm was allowed to raise the temperature to 40° C. and this temperature was maintained for the remainder of the 4 TMAC addition. Cooling water was used as needed. After 4 TMAC addition was complete, stirring was continued at 40° C. until solution viscosity rose to 90 poises, measured at 25° C. The reaction solution was then drained from the reactor and polymer precipitation was commenced immediately to minimize viscosity increase. The polymer was precipitated in distilled water in a Model D-W J. Fitzpatrick Company comminuting machine (Fitz mill) over a period of 25 minutes. Solution viscosity increased to 100 poises during this period. After precipitation the polymer was washed 5 times with distilled water to a pH of 4-5 in a stirred metal tank and the washed material was then filtered. The polymer was further dried for 3 hours in a Littleford Rotary Drier at 100° C. before being heat cured at 205° C. for 2¾ hours. Water content determined by weight loss at 500° F. (20 minutes) was 3.6 percent. At this point the dried polymer reformulated in dimethylacetamide (DMAC) had an inherent viscosity of 0.74 (the inherent viscosity was measured in a Cannon viscometer by running a 0.5 gram terpolymer per 100 ml. DMAC at 25° C. and was calculated as set forth in the Sorenson, et al. book indicated in the Specification), was 63 percent in the immidized form and had a melt flow of 13.3 grams per 10 minutes at 99 percent solids content.

Prior to injection molding, the dried polymer powder was pelletized by extruding through a circular, multiple die on a Columbo RC-9 extruder at 600° F. The resulting rod-like extrudate was cut into pellets of approximately ⅛" in diameter and ¼" in length. The pellets were molded into ASTM microtensile bars and deflection bars on a Stokes injection molding machine. The polymer was injection molded at injection molding conditions set forth in Table 2 and its physical properties are set forth in Table 5.

The reaction conditions for Examples 3 through 7 are summarized in Table 3 below and they are in general substantially the same as those for EXamples 1 and 2. The physical properties of these terpolymers are set forth in Table 4.

TABLE 3

| | REACTION OF 4 TMAC WITH MIXTURES OF OBA, MPDA AND 2,6 DAA | | | |
|---|---|---|---|---|
| Example | Diamine Moles | 4 TMAC Moles | Solvent | Reaction Temperature |
| 3 | 4.71 OBA 2.13 MPDA 0.24 DAA | 7.08 | NMP 1,419 g. | 40° C. |
| 4 | 0.70 OBA 0.33 MPDA 0.076 DAA | 1.11 | DMAC 950 cc. | 40° C. |
| 5 | 1.47 OBA 0.665 MPDA 0.0755 DAA | 2.22 | DMAC 1,900 cc. | 30° C. |
| 6 | 0.65 OBA 0.28 MPDA 0.07 DAA | 1.0 | NMP 875 cc. | 40° C. |

TABLE 3-continued

REACTION OF 4 TMAC WITH MIXTURES OF
OBA, MPDA AND 2,6 DAA

| Example | Diamine Moles | 4 TMAC Moles | Solvent | Reaction Temperature |
|---|---|---|---|---|
| 7 | 1.4 OBA .66 MPDA 0.155 DAA | 2.22 | DMAC 1,900 cc. | 30° C. |

EXAMPLE 8

This Example illustrates the use of 1,5 diaminoanthraquinone as a terpolymer component. The reaction was carried out in a 2 liter, 4 neck, round bottom flask equipped with nitrogen purge, stirrer, addition funnel and thermometer. 140.1 grams (0.70 moles) of OBA, 36.05 grams (0.33 moles) of MPDA and 18.5 grams (0.076 moles) of 1,5 diaminoanthraquinone (1,5 DAA) were dissolved in 950 cc. DMAC. 233.7 grams (1.11 moles) of 4 TMAC, in flake form, were then added to the diamine solution over a 2¼ hour period. The reaction exotherm was allowed to raise to 30° C. and this temperature was maintained for the remainder of the 4 TMAC addition. Cooling water was used as needed. After 4 TMAC addition was complete, stirring was continued without further heating until viscosity reached 36 poises, measured at 25° C. with a Gardner Bubble Viscometer. The reaction solution was then drained from the flask and polymer precipitation was commenced immediately in order to minimize viscosity increase. The polymer was precipitated at 30 to 32 percent solids content in distilled water in about 3:1 water to polymer ratio. A Waringtype blender was used at medium speed to give a roughly 35 mesh product and to minimize fines formation. The precipitated polymer was washed free of NMP and after several washings had a pH of 4–5. After air drying to 87 to 90 percent solids content, the polymer was heated for 2½ hours at 500° F. before compression molding. The physical properties of this polymer including the melt flow and compression molded properties are given in Table 4.

EXAMPLE 9

The reactants and reaction conditions are the same for this run as for Example 8, except that 0.63 moles of OBA, 0.3 moles of MPDA and 0.07 moles of 1,5 DAA were employed. The solvent was DMAC 875 cc. and 1 mole of TMAC was used. The reaction temperature was 40° C. The physical properties for this run are shown in Table 4.

EXAMPLE 10

This Example illustrates the use of 1,4 diaminoanthraquinone as a terpolymer component. The reaction was carried out in a 3 liter, 4 neck, round bottom flask equipped with nitrogen purge, stirrer, addition funnel and thermometer. 280.2 grams (1.4 moles) of OBA, 72.1 grams (0.665 moles) of MPDA and 18.46 grams (0.0775 moles of 1,4 diaminoanthraquinone (1,4 DAA) were dissolved in 1,900 cc. DMAC. 467.3 grams (2.22 moles) of 4 TMAC, in flake form, were then added to the diamine solution over a 3½ hour period. The reaction exotherm was allowed to raise to 30° C. and this temperature was maintained for the remainder of the 4 TMAC addition. Cooling water was used as needed. After 4 TMAC addition was complete, stirring was continued without further heating for two hours. The reaction solution was then drained from the reactor and polymer precipitation was commenced immediately in order to minimize viscosity increase. The polymer was precipitated at 30 to 32 percent solids content in distilled water in about 3:1 water to polymer ratio. A Waring-type blender was used at medium speed to give a roughly 35 mesh product and to minimize line formation. The precipitated polymer was washed free of NMP and after several washings had a pH of 4–5. After air drying to 87 to 90 percent solids content, the polymer was heated for 2¼ hours at 500° F. before compression molding. The physical properties of this polymer including the melt flow and compression molded properties are given in Table 4.

CONTROL

Reaction was carried out in a 10 gallon Pfaudler kettle equipped with a nitrogen purge, stirrer, addition funnel and thermocouple. 5.7 lbs. (12.9 moles) of OBA and 1.32 lbs. (5.53 moles) of MPDA were dissolved in 34.8 lbs. of DMAC. 8.55 lbs. (18.42 moles) of the 4 acid chloride of trimellitic acid anhydride (4 TMAC), in flake form, were then added to the diamine solution in portions over a 3½ hour period. The reaction exotherm was allowed to raise the temperature to 30° C. and this temperature was maintained for the remainder of the 4 TMAC addition. Cooling water was used as needed. After 4 TMAC addition was complete, stirring was continued at 30° C. until solution viscosity rose to approximately 120 to 150 poises, measured at 25° C. with a Gardner Bubble Viscometer. The reaction solution was then drained from the reactor and polymer precipitation was commenced immediately to minimize viscosity increase. The polymer was precipitated in distilled water in a Model D-W J. Fitzpatrick Company communiting machine (Fitz mill) over a period of approximately 2 hours. Solution viscosity increased to about 150 poises during this period. After precipitation the polymer was washed with distilled water to a pH of 4–5 in a centrifuge after which it was spun dry. The polymer was further dried for a few days in a vacuum oven at 50° C. before being heat cured at 500° C. for 2¼ hours. Water content determined by weight loss at 500° C. for 20 minutes was approximately 10 percent after drying at 50° C. The physical properties of this polymer including the compression molded and injection molded properties are given in Tables 4 and 5.

TABLE 4

PHYSICAL PROPERTIES OF
POLYAMIDE-IMIDE TERPOLYMERS

| Example No. | OBA:MPDA:DAA Composition | Max. Rx Temp. ° C. | Rheology Data (600° F.)* | |
|---|---|---|---|---|
| | | | Viscosity, Poises | Shear Rate, sec. |
| 1 | 63:30:7 DAA-2,6 | 40 | — | — |
| 3 | 66.5:30:3.5 | 40 | — | — |

TABLE 4-continued

PHYSICAL PROPERTIES OF POLYAMIDE-IMIDE TERPOLYMERS

| | | | | |
|---|---|---|---|---|
| 4 | 63:30:7 DAA-2,6 DAA-2,6 | 40 | $1.0 \times 10^5$ | 10.0 |
| 5 | 66.5:30:3.5 DAA-2,6 | 30 | $4 \times 10^5$ | 10.0 |
| 6 | 65:28:7 DAA-2,6 | 40 | $9 \times 10^5$ | 10.0 |
| 7 | 63:30:7 DAA-2,6 | 30 | $6.4 \times 10^5$ | 10.0 |
| 8 | 63:30:7 DAA-1,5 | 30 | $3.5 \times 10^5$ | 10.0 |
| 9 | 63:30:7 DAA-1,5 | 40 | — | — |
| 10 | 63:30:7 DAA-1,4 | 30 | $4.8 \times 10^5$ | 10.0 |
| CONTROL | 70:30 DBA:MPDA | 30 | $1.3 \times 10^6$ | 10.0 |

*Rheological properties were determined at 600° F. in a rheometer with a 1/16" diameter orifice with an L/D of 10.

| Melt Flow** Grams/10 Min. at 99% Solids Content | Inherent Viscosity | Compression Molded Properties | |
|---|---|---|---|
| | | Tensile Str. ASTMD-638, p.s.i. | ASTMD-638 Elong. % |
| — | 0.32 | 21050 | 15.9 |
| — | 0.31 | 20485 | 15.7 |
| 153.0 | 0.315 | 20590 | 13.4 |
| 103.7 | 0.34 | 12540 | 5.2 |
| 5.5 | 0.326 | 21365 | 13.8 |
| 27.8 | 0.312 | 18735 | 9.3 |
| 362.7 | 0.32 | 4425 | 2.4 |
| — | 0.27 | 6685 | 3.2 |
| 72.9 | 0.304 | 9950 | 4.8 |
| 0.43 | 0.32 | 20000 | 10-15 |

Abbreviations:
DAA 2,6 - Diaminoanthraquinone 2,6 isomer
DAA 1,5 - Diaminoanthraquinone 1,5 isomer
DAA 1,4 - Diaminoanthraquinone 1,4 isomer
OBA - Oxybis (aniline)
4 TMAC - The 4 acid chloride of trimellitic acid anhydride
**Melt flow determined by extruding sample through a 1/16" die at a force of 3,000 lbs. at 600° F. Test described in text.

TABLE 5

INJECTION MOLDING STUDIES ON POLYAMIDE-IMIDE TERPOLYMERS

| | | | PROPERTIES AS MOLDED | | | |
|---|---|---|---|---|---|---|
| Example Number | % DAA | Barrel Temp. °F. | Tensile p.s.i.** | Mod. p.s.i.** | Elong. %** | HDT* °F. |
| 1 | 7.0 DAA-2,6 | 550 575 | 17710 | $0.92 \times 10^6$ | 2.20 | 495 |
| 1 | 7.0 DAA-2,6 | 625 | 14400 | — | 3.4 | 495 |
| 2 | 7.0 DAA-2,6***** | 600 | 17460 | — | 4.3 | 463 |
| 3 | 3.5 DAA-2,6 | 550 575 | 14830 | $0.85 \times 10^6$ | 1.96 | 490 |
| 3 | 3.5 DAA-2,6 | 625 | 13100 | — | 2.9 | 483 |
| CONTROL | 70:30 OBA:MPDA | 625-650 | 11000-16000 | — | 1.7-2.7 | 400-460 |

Abbreviation:
DAA - Diaminoanthraquinone
*Heat deflection temperature ASTMD-48, ¼" specimen at 264 p.s.i.
**Tensile modulus and elongation were determined by ASTMD-638.
*****The melt flow for terpolymer prepared in Example 2 is 13.3 grams/10 minutes at 99 percent solids content.

PROPERTIES ANNEALED****

| Tensile p.s.i.** | Mod. p.s.i.** | Elong. %** | Flex Str. p.s.i.*** | Mod. p.s.i.** | HDT* °F. | Izod Impact ASTMD-256 |
|---|---|---|---|---|---|---|
| 28770 | $0.92 \times 10^6$ | 7.0 | 36550 | $0.87 \times 10^6$ | 528 | 2.22 |
| 29730 | — | 5.9 | — | — | — | — |
| 32195 | — | 12.5 | — | — | 516 | 2.22 |

TABLE 5-continued

INJECTION MOLDING STUDIES ON POLYAMIDE-IMIDE TERPOLYMERS

| | | | | | | |
|---|---|---|---|---|---|---|
| 26360 | $0.81 \times 10^6$ | 5.0 | 36940 | $0.8 \times 10^6$ | 533 | 2.22 |
| 27260 | — | 6.2 | — | — | — | — |
| 26900 | — | 8.0–9.4 | 26400 | $0.66 \times 10^6$ | 525 | 2.22 |

Abbreviation:
DAA - Diaminoanthraquinone
*Heat deflection temperature ASTMD-48, ¼" specimen at 264 p.s.i.
**Tensile modulus and elongation were determined by ASTMD-638
***Tensile modulus and elongation were determined by ASTMD-790, ¼" bar, 2" span
****Samples were further heat treated for 48 hours at a temperature of 500° F.

I claim:

1. An injection moldable polyamide terpolymer capable of undergoing imidization consisting essentially of the following recurring structures containing amido linkages:

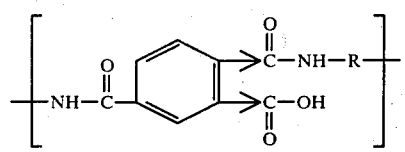

wherein an arrow denotes isomerism and wherein R consists essentially of $R_1$, $R_2$, $R_3$ and $R_4$ and $R_1$ is a divalent aromatic quinone radical containing at least two aromatic rings having from 14 to 26 carbon atoms, $R_2$ and $R_3$ are different and are divalent aromatic hydrocarbon radicals of from 6 to 10 carbon atoms joined directly or by stable linkages consisting of —O—, methylene,

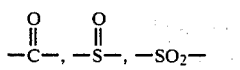

and —S— radicals, and $R_4$ is a saturated alkylene radical of from 2 to 10 carbon atoms and wherein the mole ratio of the $R_1$ containing units to the sum of the $R_2$, $R_3$ and $R_4$ containing units is about 1:99 to about 1:9.

2. The terpolymer of claim 1 wherein R comprises $R_1$, $R_2$ and $R_3$ and the mole ratio of the $R_1$ containing units to the sum of the $R_2$ and $R_3$ containing units is about 1:99 to about 1:9.

3. The terpolymer of claim 2 wherein $R_1$ has the following formula:

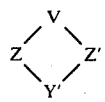

wherein Z and Z' are the same or different and are divalent aromatic moieties containing from 1 to 3 benzene rings, Y is a stable linkage selected from the group of

and —CH$_2$—, and Y' is selected from the group of

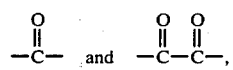

and wherein the mole ratio of the $R_2$ and $R_3$ containing units is about 3:7 to about 7:3.

4. The terpolymer of claim 2 wherein $R_1$ is:

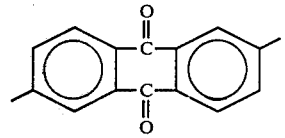

$R_2$ is:

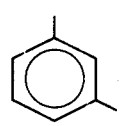

and $R_3$ is:

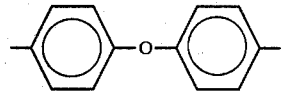

5. The terpolymer of claim 2 wherein $R_1$ is:

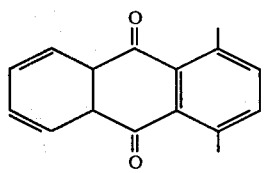

$R_2$ is

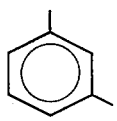

and $R_3$ is:

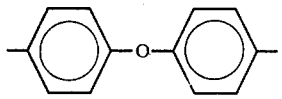

6. An injection moldable polyamide consisting essentially of the recurring structures containing both amido and imido linkages:

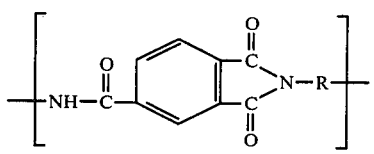

wherein R consists essentially of $R_1$, $R_2$, $R_3$ and $R_4$ and $R_1$ is a divalent aromatic quinone radical containing at least two aromatic rings having from 14 to 26 carbon atoms, $R_2$ and $R_3$ are different and are divalent aromatic hydrocarbon radicals of from 6 to 10 carbon atoms joined directly or by stable linkages consisting of —O—, methylene,

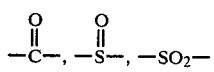

and —S— radicals, and $R_4$ is an alkylene radical of from 2 to 10 carbon atoms and wherein the mole ratio of the $R_1$ containing units to the sum of the $R_2$, $R_3$ and $R_4$ containing units is about 1:99 to about 1:9.

7. The terpolymer of claim 1 wherein the mole ratio of the $R_2$ and $R_3$ containing units is about 3:7 to about 7:3.

8. The terpolymer of claim 7 wherein $R_1$ has the following formula:

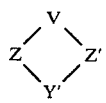

wherein Z and Z' are the same or different and are divalent aromatic moieties containing from 1 to 3 benzene rings, Y is a stable linkage selected from the group of

and —CH$_2$—, and Y' is selected from the group of

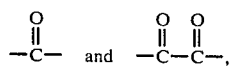

and wherein the mole ratio of the $R_2$ and $R_3$ containing units is about 3:7 to about 7:3.

9. The terpolymer of claim 2 wherein $R_1$ is:

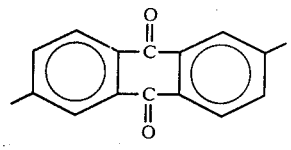

$R_2$ is:

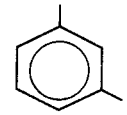

and $R_3$ is:

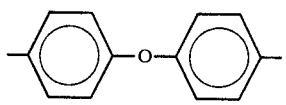

10. The terpolymer of claim 6 wherein $R_1$ is:

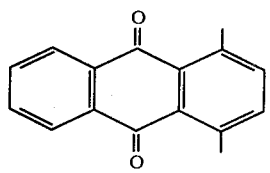

$R_2$ is

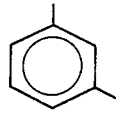

and $R_3$ is:

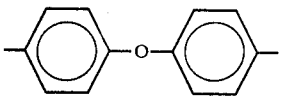

11. An injection moldable terpolymer consisting essentially of recurring A units of structures containing amido linkages:

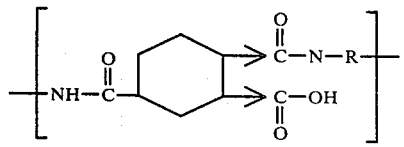

wherein an arrow denotes isomerism and recurring B units of structures containing both amido and imido linkages:

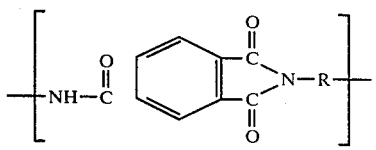

wherein an arrow denotes isomerism and wherein both A and B units consists essentially of $R_1$, $R_2$, $R_3$ and $R_4$ and $R_1$ is a divalent aromatic quinone radical containing at least two aromatic rings having from 14 to 26 carbon atoms, $R_2$ and $R_3$ are different and are divalent aromatic hydrocarbon radicals to from 6 to 10 carbon atoms joined directly or by stable linkages consisting of —O—, methylene,

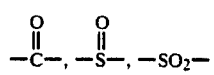

and —S— radicals, and $R_4$ is an alkylene radical of from 2 to 10 carbon atoms and wherein the mole ratio of the $R_1$ containing units to the sum of the $R_2$, $R_3$ and $R_4$ containing units is about 1:99 to about 1:9, and wherein the proportion of A and B units runs from about 1 mole percent A units and about 99 mole percent B units to about 99 mole percent A units and about 1 mole percent B units, and wherein said terpolymer is further characterized by having a flow rate in the range of about 1 to about 400 grams per 10 minutes, at 99 percent solids content.

12. The terpolymer of claim 11 wherein R comprises $R_1$, $R_2$, and $R_3$ and the mole ratio of $R_1$ containing units to the sum of the $R_2$ and $R_3$ containing units is about 1:99 to about 1:9.

13. The terpolymer of claim 12 wherein $R_1$ has the following formula:

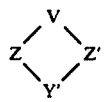

wherein Z and Z' are the same or different and are divalent aromatic moieties containing from 1 to 3 benzene rings, Y is a stable linkage selected from the group of $$-\overset{O}{\underset{\|}{C}}-$$

and —CH$_2$— and Y' is selected from the group of

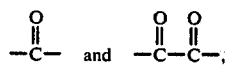

and wherein the mole ratio of the $R_2$ and $R_3$ containing units is about 3:7 to about 7:3.

14. The terpolymer of claim 13 wherein the proportion of A and B units runs from about 30 mole percent A units and about 70 mole percent B units to about 70 mole percent A units and 30 mole percent B units.

15. The terpolymer of claim 13 wherein $R_1$ is:

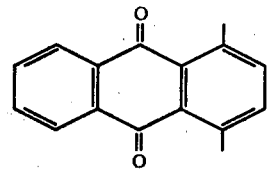

16. The terpolymer of claim 15 wherein $R_2$ is:

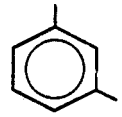

and $R_3$ is:

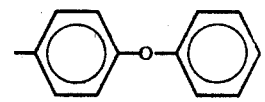

17. The terpolymer of claim 14 wherein $R_1$ is:

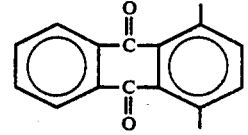

18. The terpolymer of claim 17 wherein $R_2$ is:

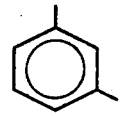

and $R_3$ is:

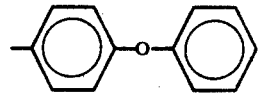

19. The terpolymer of claim 13 wherein the terpolymer is in the form of a molded object.

* * * * *

UNITED STATES PATENT OFFICE
CERTIFICATE OF CORRECTION

Patent No. 4,186,263            Dated January 22, 1980

Inventor(s) Edward F. Morello

It is certified that error appears in the above-identified patent and that said Letters Patent are hereby corrected as shown below:

| Column | Patent Line | |
|---|---|---|
| 2 | 33 | "reoccurring" should be -- recurring -- |
| 3 | 1 - 2 | "reoccurring" should be -- recurring -- |
| 4 | 46 | "p,p' oxybis(aniline)" should be -- p,p' - oxybis(aniline) -- |
| 4 | 51 | "p,p' oxybis(aniline)" should be -- p,p' - oxybis(aniline) -- |
| 7 | 9 | "are weighed" should be -- is weighed -- |
| 7 | 9 - 10 | ", and expressed" should be -- and expressed -- |
| 7 | 51 | "chopped from" should be -- chopped with -- |
| 10 | 46 | "communiting" should be -- comminuting -- |
| 8 | 35 | "immidized" should be -- imidized -- |
| 8 | 51 | "EXamples" should be -- Example -- |
| 11 | 12 | "DBA" should be -- OBA -- |
| 13 | 54 | "V" should be -- Y -- |
| 15 | 41 | "V" should be -- Y -- |
| 16 | 64 | "units consists" should be -- unit R consist -- |

UNITED STATES PATENT OFFICE
CERTIFICATE OF CORRECTION

Patent No. 4,186,263              Dated January 22, 1980

Inventor(s) Edward F. Morello

It is certified that error appears in the above-identified patent and that said Letters Patent are hereby corrected as shown below:

| Patent Column | Line | |
|---|---|---|
| 16 | 68 | "to" should be -- of -- |
| 17 | 26 | "V" should be -- Y -- |

Signed and Sealed this

*Twenty-first* Day of *July 1981*

[SEAL]

Attest:

Attesting Officer

GERALD J. MOSSINGHOFF

*Commissioner of Patents and Trademarks*